(12) United States Patent
Brady

(10) Patent No.: US 12,471,591 B1
(45) Date of Patent: Nov. 18, 2025

(54) UNIVERSAL FIT, NON-TANGLE, WATER DEPTH ADJUSTABLE SYSTEMS FOR SECURING WATERFOWL HUNTING LURES

(71) Applicant: Lucas Richard Brady, Hamburg, IL (US)

(72) Inventor: Lucas Richard Brady, Hamburg, IL (US)

(73) Assignee: BAND-IT WATERFOWL GEAR LLC, Hamburg, IL (US)

( * ) Notice: Subject to any disclaimer, the term of this patent is extended or adjusted under 35 U.S.C. 154(b) by 0 days.

(21) Appl. No.: 18/777,372

(22) Filed: Jul. 18, 2024

(51) Int. Cl.
*A01M 31/06* (2006.01)

(52) U.S. Cl.
CPC .................. A01M 31/06 (2013.01)

(58) Field of Classification Search
CPC ....... A01M 31/06; A01M 31/00; B63B 21/24; B63B 21/22; B63B 22/00; B63B 2021/225
USPC .......................................................... 43/2, 3
See application file for complete search history.

(56) References Cited

U.S. PATENT DOCUMENTS

| | | | | |
|---|---|---|---|---|
| 1,617,153 A * | 2/1927 | Gibbs | ................... | A01M 31/06 119/714 |
| 1,879,991 A * | 9/1932 | Pratt | ..................... | A01M 31/06 119/714 |
| 5,822,907 A * | 10/1998 | Lukey | ................... | A01M 31/06 43/3 |
| 5,899,014 A * | 5/1999 | Bornhoft | ............... | A01M 31/06 43/3 |
| 6,357,161 B1 * | 3/2002 | Best | ....................... | A01M 31/06 43/3 |
| 8,443,747 B1 * | 5/2013 | Cardarelli | ............... | B63B 21/04 114/221 R |
| 9,258,993 B2 * | 2/2016 | Szechenyi | ............... | F16H 21/44 |
| 10,555,518 B2 * | 2/2020 | Anderson | ............. | A01M 31/06 |
| 2006/0242883 A1 * | 11/2006 | Tilby | .................... | A01M 31/06 43/3 |
| 2012/0073181 A1 * | 3/2012 | Loidolt | ................. | A01M 31/06 43/3 |
| 2014/0331542 A1 * | 11/2014 | Andrews | ............... | A01M 31/06 43/3 |
| 2016/0295853 A1 * | 10/2016 | Evenson, III | ......... | A01M 29/06 |
| 2018/0192637 A1 * | 7/2018 | Chapman | .............. | A01M 31/06 |
| 2020/0390086 A1 * | 12/2020 | Butz | ..................... | A01M 31/06 |
| 2023/0123980 A1 * | 4/2023 | Carmack | ............... | A01M 31/06 43/3 |

\* cited by examiner

*Primary Examiner* — Morgan T Jordan
*Assistant Examiner* — Carly W. Lynch
(74) *Attorney, Agent, or Firm* — Carr & Ferrell LLP

(57) ABSTRACT

The present technology in various embodiments provides a universal fit, non-tangle, water depth adjustable system for securing waterfowl hunting lures, such as duck and goose decoys. The system comprises an adjustable silicone band, a vinyl-coated cable, and adjustable stainless steel clips. The adjustable silicone band allows for quick attachment and removal from the decoy, ensuring durability and preventing tangling. The vinyl-coated cable is designed to be tangle-free and can be adjusted to different water depths using the stainless steel clips. The system also includes a swivel and additional clips for secure attachment of weights. This innovative design addresses the common issues of tangling, lack of adjustability, and durability found in traditional decoy rigs, providing hunters with an efficient and effective solution for deploying and storing decoys.

14 Claims, 6 Drawing Sheets

UNIVERSAL FIT, NON-TANGLE, WATER DEPTH ADJUSTABLE SYSTEMS FOR SECURING WATERFOWL HUNTING LURES

FIELD OF TECHNOLOGY

Embodiments of the present disclosure relate to hunting equipment, specifically to systems for securing waterfowl hunting lures such as duck and goose decoys. More particularly, the invention pertains to a universal fit, non-tangle water depth adjustable system that allows for quick attachment and removal of decoys, providing enhanced durability, ease of use, and efficient storage.

BACKGROUND

Previous systems for securing waterfowl hunting lures in water have typically involved the use of fixed-length cables or ropes that are permanently attached to the keel of the lure. These fixed-length cables can often become tangled during storage or deployment, leading to frustration and inefficiency for users. Additionally, the fixed nature of these cables limits the depth at which the lure can be submerged, potentially impacting the effectiveness of the hunting setup.

Some existing solutions have attempted to address the issue of tangling by incorporating rotating mechanisms into the cable connections. While these features can help reduce tangling to some extent, they do not provide a comprehensive solution for preventing tangles altogether. Furthermore, these solutions do not offer the flexibility to adjust the depth at which the lure is submerged in the water, which can be a critical factor in attracting waterfowl.

Other approaches have utilized complex locking mechanisms or fastening devices to secure the cable to the keel of the lure. However, these mechanisms can be cumbersome to operate, especially in cold or wet conditions typically encountered during waterfowl hunting. Moreover, these solutions may not allow for quick and easy adjustment of the cable length, making it difficult for users to adapt to changing water depths or hunting conditions. Overall, while various attempts have been made to improve the functionality and convenience of waterfowl hunting lure securing systems, none have provided a comprehensive solution that combines the features described in this disclosure.

SUMMARY

In some embodiments the systems described herein relate to a non-tangle, water depth adjustable system for securing a waterfowl hunting lure, the system comprising: a cable including: a top cable end for being connected to a keel of the waterfowl hunting lure; and a bottom cable end for being connected to a weight; an adjustable silicone band allowing for connection and removal of the top cable end from the waterfowl hunting lure, the adjustable silicone band in a closed storage state and being actuatable to an open state, the adjustable silicone band including a releasable attachment mechanism; the releasable attachment mechanism including elasticity of the adjustable silicone band so that the adjustable silicone band stretches when actuated between the closed storage state and the open state; the closed storage state attaching a length of the cable to the keel of the waterfowl hunting lure without tangling the length of the cable; and the open state connecting the top cable end to the keel of the waterfowl hunting lure and releasing the bottom cable end for being connected to the weight and releasing the length of the cable from the keel of the waterfowl hunting lure without tangling the length of the cable.

In some embodiments, the top cable end includes a top finger loop, the top finger loop being a loop in the top cable end for attaching the top cable end to the adjustable silicone band.

In some embodiments, the cable includes a vinyl-coated, rustless metal material, the vinyl-coated, rustless metal material being tangle-free.

In some embodiments, the bottom cable end includes a bottom loop, the bottom loop being a loop in the bottom cable end for connecting the bottom cable end to the weight.

In some embodiments, the top cable end includes a top finger loop, the top finger loop being a loop in the top cable end for attaching the top cable end to the adjustable silicone band; wherein the bottom cable end includes a bottom loop, the bottom loop being a loop in the bottom cable end for connecting the bottom cable end to the weight; and wherein a bottom loop perimeter is smaller than a top finger loop perimeter.

In some embodiments, the cable is six feet long.

In some embodiments, the bottom loop is attached to one or more additional cables to allow the system to be water depth adjustable.

In some embodiments, the bottom loop is releasably attached to a swivel using a first water depth adjustable clip, and the swivel is releasably attached to the weight using a second clip, the first water depth adjustable clip being adjustable on the cable, allowing for adjusting a connection point between the top cable end and the bottom cable end according to water depth In some embodiments, the bottom loop is releasable attached to a swivel using a first water depth adjustable clip and the swivel being releasable attached to the weight using a second clip, the first water depth adjustable clip being attached to the cable at a connection point between the top cable end and the bottom cable end according to water depth allowing for adjusting of the connection point between the top cable end and the bottom cable end according to water depth.

In some embodiments the systems described herein relate to a non-tangle, water depth adjustable system for securing a waterfowl hunting lure, the system including: a cable including: a top cable end for being connected to a keel of the waterfowl hunting lure; and a bottom cable end for being connected to a weight; an adjustable silicone band allowing for connection and removal of the top cable end from the waterfowl hunting lure, the adjustable silicone band being in an open state and being actuatable to an closed storage state, the adjustable silicone band including a releasable attachment mechanism; the releasable attachment mechanism including elasticity of the adjustable silicone band so that the adjustable silicone band stretches when actuated between the open state and the closed storage state; the closed storage state attaching a length of the cable to the keel of the waterfowl hunting lure without tangling the length of the cable; the open state connecting the top cable end to the keel of the waterfowl hunting lure and releasing the bottom cable end for being connected to the weight and releasing the length of the cable from the keel of the waterfowl hunting lure without tangling the length of the cable; and wherein the bottom cable end is releasable attached to a swivel using a first water depth adjustable clip and the swivel being releasable attached to the weight, the first water depth adjustable clip being adjustable on the cable allowing for adjusting a connection point between the top cable end and the bottom cable end according to water depth.

In some embodiments the systems described herein relate to a non-tangle, water depth adjustable system for securing a waterfowl hunting lure, the system including: a cable including: a top cable end for being connected to a keel of the waterfowl hunting lure; and a bottom cable end for being connected to a weight; an adjustable silicone band allowing for connection and removal of the top cable end from the waterfowl hunting lure, the adjustable silicone band being in an open state and being actuatable to an closed storage state, the adjustable silicone band including a releasable attachment mechanism; the releasable attachment mechanism including elasticity of the adjustable silicone band so that the adjustable silicone band stretches when actuated between the open state and the closed storage state; the closed storage state attaching a length of the cable to the keel of the waterfowl hunting lure without tangling the length of the cable; the open state connecting the top cable end to the keel of the waterfowl hunting lure and releasing the bottom cable end for being connected to the weight and releasing the length of the cable from the keel of the waterfowl hunting lure without tangling the length of the cable; and wherein the bottom cable end includes a bottom loop, the bottom loop being releasable attached to a swivel using a first water depth adjustable clip and the swivel being releasable attached to the weight using a second clip, the first water depth adjustable clip being attached to the cable the bottom loop.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

DESCRIPTION OF EXEMPLARY EMBODIMENTS

Figure 1:
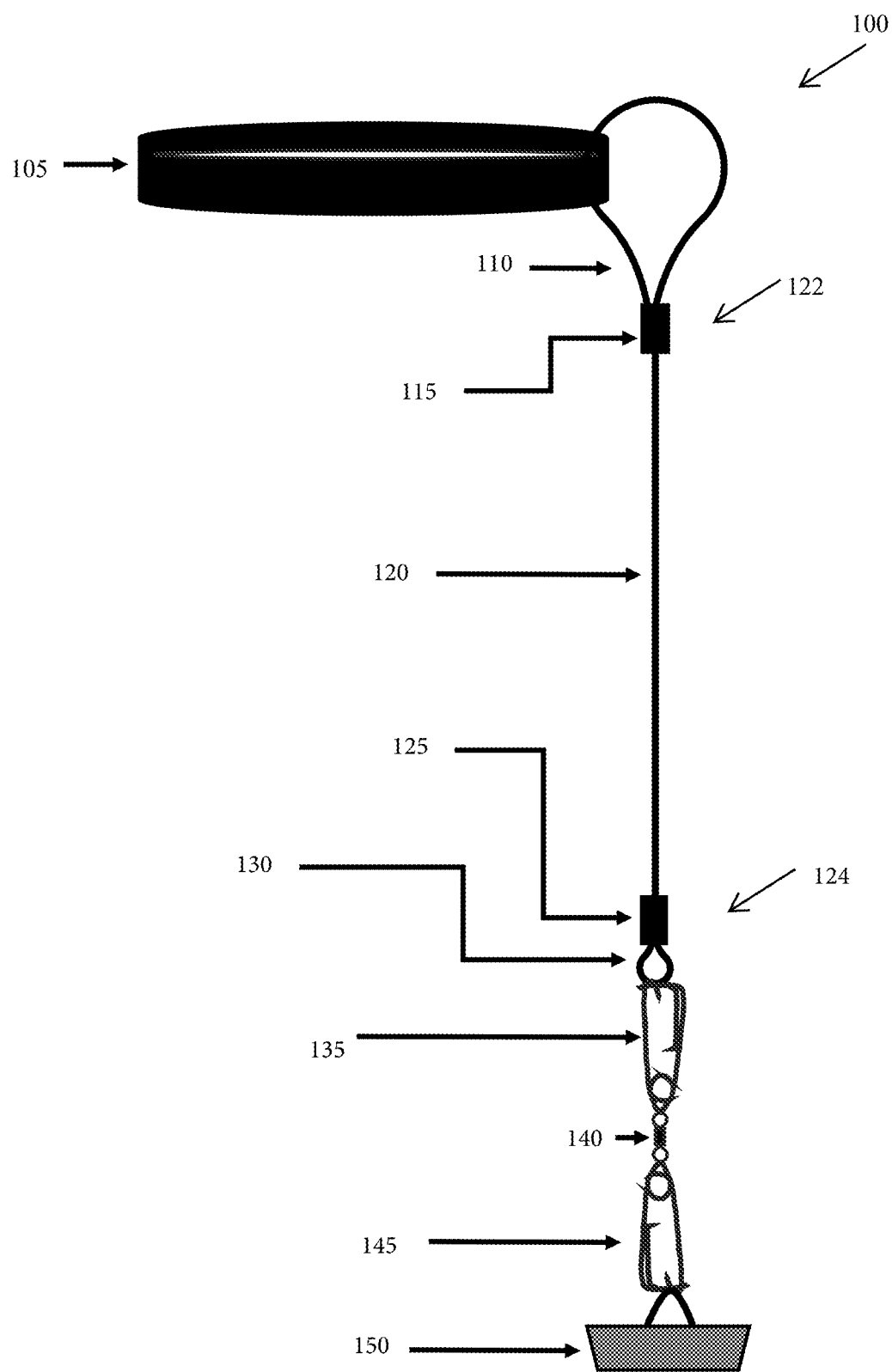
FIG. 1 illustrates the fully extended system for securing a waterfowl hunting lure, in an open state, according to various embodiments of the present technology.

In the following description, for purposes of explanation, numerous specific details are set forth in order to provide a thorough understanding of the disclosure. It will be apparent, however, to one skilled in the art, that the disclosure may be practiced without these specific details. In other instances, structures and devices may be shown in block diagram form only in order to avoid obscuring the disclosure. It should be understood that the disclosed embodiments are merely exemplary of the invention, which may be embodied in multiple forms. Those details disclosed herein are not to be interpreted in any form as limiting, but as the basis for the claims.

Traditional decoy rigs used in waterfowl hunting often suffer from several significant drawbacks. Typically, these rigs include a tarred string or a Polyvinyl Chloride (PVC) cord with one end tied to the keel of a waterfowl hunting lure (e.g., duck decoy) and the other end connected to a weight. These conventional methods present numerous challenges including tangling, lack of adjustability, durability issues, and time-consuming deployment. For example, both tarred strings and PVC cords are prone to tangling, especially when multiple decoys are stored together. This results in a tangled mess that is time-consuming and frustrating for hunters to untangle and deploy. For example, traditional decoy rigs are not easily adjustable to different water depths. Hunters often face varying water conditions, and the inability to quickly adjust the length of the rig can lead to inefficient and ineffective decoy placement. For example durability issues exist with traditional rigs. For instance, PVC cords, in particular, are known to break easily and hold a memory, which further complicates their use. Tarred strings, while more durable, still suffer from tangling and are not adjustable. For example, the process of tying and untying knots to secure decoys is labor-intensive and time-consuming, detracting from the overall hunting experience.

These issues highlight the need for an improved system that addresses the shortcomings of traditional decoy rigs. The present technology provides a solution that does not tangle, is water depth adjustable, and easy to use, thereby enhancing the efficiency and effectiveness of waterfowl hunting.

The present technology provides a comprehensive solution to the problems associated with traditional decoy rigs. The non-tangle, water depth adjustable system for securing waterfowl hunting lures includes the following innovative features. Some embodiments include an adjustable silicone band. The use of an adjustable silicone band allows for quick attachment and removal from the waterfowl hunting lure. This adjustable silicone band may be weather-resistant and ultraviolet (UV) light-resistant, ensuring durability and longevity. Unlike traditional rubber bands or PVC cords, the adjustable silicone band does not deteriorate or break easily. Silicone is a synthetic polymer made up of silicon, oxygen and other elements, most typically carbon and hydrogen. Silicone is a flexible, rubberlike plastic, and has a number of useful properties, such as low toxicity and high heat resistance and is weather-resistant and UV light-resistant.

Various embodiments include a non-tangle design. The present technology is designed to prevent tangling, a common issue with traditional decoy rigs. Some embodiments include the vinyl-coated cable and the adjustable silicone band that work together to ensure that the cable does not tangle, even when stored or deployed in various water depths.

Various embodiments include water depth adjustability. For example, the system may include adjustable stainless steel clips that allow for quick and easy adjustment of the cable length according to different water depths. This feature is particularly useful for hunters who need to deploy decoys in varying water conditions.

Various embodiments include a versatile connection mechanism. For example, the system may include a top cable end and a bottom cable end, with a top finger loop for easy attachment. The bottom cable end can be connected to a weight using a swivel and adjustable clips, allowing for secure and adjustable deployment of the decoy.

Various embodiments include storage efficiency. For example, the system allows for efficient storage by wrapping the cable around the keel of the decoy and securing it with the adjustable silicone band. This prevents the decoys from getting scratched and eliminates tangles during storage.

According to various embodiments, By addressing the issues of tangling, lack of adjustability, durability, and time-consuming deployment, the present technology provides users (e.g., hunters) with an efficient and effective solution for deploying and storing decoys, thereby enhancing the overall hunting experience.

FIG. 1 illustrates the fully extended system for securing a waterfowl hunting lure, in an open state 100, according to various embodiments of the present technology. According to various embodiments, FIG. 1 depicts a non-tangle, water depth adjustable system for securing a waterfowl hunting lure. The system may include a cable 120 comprising a top cable end 122 for being connected to a keel of the waterfowl hunting lure; and a bottom cable end 124 for being connected to a weight 150. The system may further include an adjustable silicone band 105 allowing for connection and removal of the top cable end 122 from the waterfowl hunting lure, the adjustable silicone band 105 in a closed storage state 600 (shown in FIG. 6) and being actuatable to an open state 100, the adjustable silicone band 105 comprising a releasable attachment mechanism (shown in FIG. 3); the releasable attachment mechanism (shown in FIG. 3) comprising elasticity of the adjustable silicone band 105 so that the adjustable silicone band 105 stretches when actuated between the closed storage state 600 (shown in FIG. 6) and the open state 100; the closed storage state 600 (shown in FIG. 6) attaching a length of the cable 120 to the keel of the waterfowl hunting lure without tangling the length of the cable 120; and the open state 100 connecting the top cable end 122 to the keel of the waterfowl hunting lure (shown in FIG. 3, FIG. 4, and FIG. 5) and releasing the bottom cable end 124 for being connected to the weight 150 and releasing the length of the cable 120 from the keel of the waterfowl hunting lure without tangling the length of the cable 120.

In some embodiments, the top cable end 122 comprises a top finger loop 110, the top finger loop 110 being a loop in the top cable end 122 for attaching the top cable end 122 to the adjustable silicone band 105. The top finger loop 110 may be formed using a top crimp 115 such as an aluminum crimp.

In some embodiments, the top finger loop 110 is a component of the non-tangle, water depth adjustable system for securing waterfowl hunting lures. The top finger loop 110 is formed at the top cable end 122 and serves as the primary attachment point for connecting the cable to the adjustable silicone band 105. The top finger loop 110 is designed to facilitate quick and secure attachment and removal of the cable from the waterfowl hunting lure, enhancing the overall usability and efficiency of the system. The top finger loop 110 may be formed using the top crimp 115 such as an aluminum crimp.

In various embodiments the top finger loop 110 is constructed from a durable material, the top finger loop 110 is typically formed using the top crimp 115, such as an aluminum crimp, which ensures a strong and reliable connection. The top finger loop 110 design allows users to easily insert a finger or tool to manipulate the loop, making the loop simple to attach or detach the cable from the adjustable silicone band 105. This feature is beneficial in cold or wet conditions, where dexterity may be compromised.

In various embodiments the top finger loop 110 also plays a role in maintaining the system's non-tangle properties. By providing a secure and stable attachment point, the top finger loop 110 helps to prevent the cable 120 from becoming entangled during deployment or storage. This ensures that the decoy remains properly positioned in the water, contributing to a more effective and efficient hunting setup.

In some embodiments, the top finger loop 110 may be designed with a larger perimeter compared to the bottom loop 130. This size differentiation allows for easier identification and handling of the top cable end 122, further simplifying the process of attaching and removing the cable from the waterfowl hunting lure. The robust construction and thoughtful design of the top finger loop 110 make the top finger loop 110 a component in the overall functionality and reliability of the non-tangle, water depth adjustable system.

In some embodiments, the bottom cable end 124 comprises a bottom loop 130, the bottom loop 130 being a loop in the bottom cable end 124 for connecting the bottom cable end 124 to the weight 150. The bottom loop 130 may be formed using a bottom crimp 125 such as an aluminum crimp.

In some embodiments, the bottom loop 130 is an integral part of the non-tangle, water depth adjustable system for securing waterfowl hunting lures. Located at the bottom cable end 124, the bottom loop 130 serves as the primary attachment point for connecting the cable 120 to the weight 150. This loop is designed to facilitate quick and secure attachment and removal of the weight 150, enhancing the overall usability and efficiency of the system. Constructed from a durable material, the bottom loop 130 is typically formed using the bottom crimp 125, such as an aluminum crimp, which ensures a strong and reliable connection. The design of the bottom loop 130 allows users to easily attach or detach the weight 150 from the cable. This feature is particularly beneficial in cold or wet conditions, where dexterity may be compromised. Additionally, the bottom loop 130 plays a role in maintaining the system's non-tangle properties by providing a secure and stable attachment point, preventing the cable 120 from becoming entangled during deployment or storage. This ensures that the decoy remains properly positioned in the water, contributing to a more effective and efficient hunting setup.

In some embodiments, the bottom loop 130 may be designed with a smaller perimeter compared to the top finger loop 110, allowing for easier identification and handling of the bottom cable end 124. The robust construction and thoughtful design of the bottom loop 130 make it a useful component in the overall functionality and reliability of the non-tangle, water depth adjustable system.

In some embodiments, the top cable end 122 comprises the top finger loop 110, the top finger loop 110 being a loop in the top cable end 122 for attaching the top cable end 122 to the adjustable silicone band 105. For example, wherein the bottom cable end 124 comprises a bottom loop 130, the bottom loop 130 being a loop in the bottom cable end 124 for connecting the bottom cable end 124 to the weight 150; and wherein a bottom loop perimeter is smaller than a top finger loop perimeter.

In some embodiments, the top cable end 122 comprises the top finger loop 110, the top finger loop 110 being a loop in the top cable end 122 for attaching the top cable end 122 to the adjustable silicone band 105. Furthermore, the bottom cable end 124 may comprise a bottom loop 130, the bottom loop 130 being a loop in the bottom cable end 124 for connecting the bottom cable end 124 to the weight 150. In some instances, a bottom loop perimeter is smaller than a top finger loop perimeter. In other words, the bottom loop 130 may be smaller than the top finger loop 110. The bottom loop 130 may be smaller than the top finger loop 110, a design choice that offers several practical advantages. This size differentiation allows for easier identification and handling of the cable ends, simplifying the process of attaching and removing the cable 120 from the waterfowl hunting lure. The smaller bottom loop 130, located at the bottom cable end 124, is specifically designed to connect to the weight 150, ensuring a secure and stable attachment. The larger top finger loop 110, positioned at the top cable end 122, facilitates quick and secure attachment to the adjustable silicone band 105. This distinction in loop sizes not only enhances the usability of the system but also contributes to its non-tangle properties. By providing clear visual and tactile cues, users can quickly and efficiently manage the cable, even in challenging conditions such as cold or wet environments. The thoughtful design of having the smaller bottom loop 130 and the larger top finger loop 110 ensures that the system remains user-friendly, dependable, and effective in various waterfowl hunting scenarios.

In some embodiments, the cable 120 comprises a vinyl-coated, rustless metal material, the vinyl-coated, rustless metal material being tangle-free. In some embodiments, the cable 120 comprises a vinyl-coated, rustless metal material. The vinyl-coated, rustless metal material is designed to be tangle-free, ensuring that the cable does not tangle even when stored or deployed in various water depths. This feature enhances the durability and usability of the system, providing hunters with a reliable and efficient solution for securing waterfowl hunting lures.

In some embodiments, the cable 120 is six feet long. This length is optimized for most waterfowl hunting conditions, providing a balance between ease of deployment and effective decoy placement. A six-foot cable allows hunters to deploy decoys in a variety of water depths without the need for constant adjustments or extensions. This length is particularly advantageous in shallow to moderately deep water, where it ensures that the decoy remains stable and properly positioned. Additionally, the six-foot length minimizes the risk of tangling, as it is long enough to provide flexibility but not so long that the cable 120 becomes cumbersome to manage. The vinyl coating on the cable further enhances its tangle-free properties, making it a reliable and efficient choice for users (e.g., hunters).

In some embodiments, the bottom loop 130 is releasable attached to a swivel 140 using a first water depth adjustable clip 135 and the swivel 140 being releasable attached to the weight 150 using a second clip 145, the first water depth adjustable clip 135 being adjustable on the cable 120 allowing for adjusting a connection point between the top cable end 122 and the bottom cable end 124 according to water depth.

In some embodiments, the swivel 140 prevents tangling of the system. For example, a decoy may float on top of the water with the weight 150 resting on the bottom of a lake or marsh. Decoys typically move and spin all day long as the wind changes and water currents flow due to changing weather conditions during waterfowl hunting. Furthermore, many users (e.g., hunters) leave decoys out for the entire season. The swivel 140 allows the decoy and the cable 120 to freely spin while the weight 150 remains stationary, which prevents tangling of the cable 120.

In some embodiments the system includes a cable 120 includes a top cable end 122 for being connected to a keel of the waterfowl hunting lure; and a bottom cable end 124 for being connected to a weight 150; an adjustable silicone band 105 allowing for connection and removal of the top cable end 122 from the waterfowl hunting lure, the adjustable silicone band 105 being in an open state 100 and being actuatable to a closed storage state 600 (shown in FIG. 6), the adjustable silicone band 105 comprising a releasable attachment mechanism; the releasable attachment mechanism comprising elasticity of the adjustable silicone band 105 so that the adjustable silicone band 105 stretches when actuated between the open state 100 and the closed storage state 600 (shown in FIG. 6); the closed storage state 600 (shown in FIG. 6) attaching a length of the cable 120 to the keel of the waterfowl hunting lure without tangling the length of the cable 120; the open state 100 connecting the top cable end 122 to the keel of the waterfowl hunting lure (shown in FIG. 3, FIG. 4, and FIG. 5) and releasing the bottom cable end 124 for being connected to the weight 150 and releasing the length of the cable 120 from the keel of the waterfowl hunting lure without tangling the length of the cable 120; and wherein the bottom cable end 124 is releasable attached to a swivel 140 using a first water depth adjustable clip 135 and the swivel 140 being releasable attached to the weight 150, the first water depth adjustable clip 135 being adjustable on the cable 120 allowing for adjusting a connection point 123 between the top cable end 122 and the bottom cable end 124 according to water depth.

In some embodiments the system includes a cable 120 including a top cable end 122 for being connected to a keel of the waterfowl hunting lure; and a bottom cable end 124 for being connected to a weight 150; an adjustable silicone band 105 allowing for connection and removal of the top cable end 122 from the waterfowl hunting lure, the adjustable silicone band 105 being in an open state 100 and being actuatable to a closed storage state 600 (shown in FIG. 6), the adjustable silicone band 105 comprising a releasable attachment mechanism; the releasable attachment mechanism comprising elasticity of the adjustable silicone band 105 so that the closed adjustable silicone band 105 stretches when actuated between the open state 100 and the closed storage state 600 (shown in FIG. 6); the closed storage state 600 (shown in FIG. 6) attaching a length of the cable 120 to the keel of the waterfowl hunting without tangling the length of the cable 120; the open state 100 connecting the top cable end 122 to the keel of the waterfowl hunting lure (shown in FIG. 3, FIG. 4, and FIG. 5) and releasing the bottom cable end 124 for being connected to the weight 150 and releasing the length of the cable 120 from the keel of the waterfowl hunting lure without tangling the length of the cable 120; and wherein bottom cable end 124 comprises a bottom loop 130, the bottom loop 130 being releasable attached to a swivel 140 using a first water depth adjustable clip 135 and the swivel 140 being releasable attached to the weight 150 using a second clip 145, the first water depth adjustable clip 135 being attached to the cable 120 a bottom loop 130 the bottom loop 130.

Figure 2:
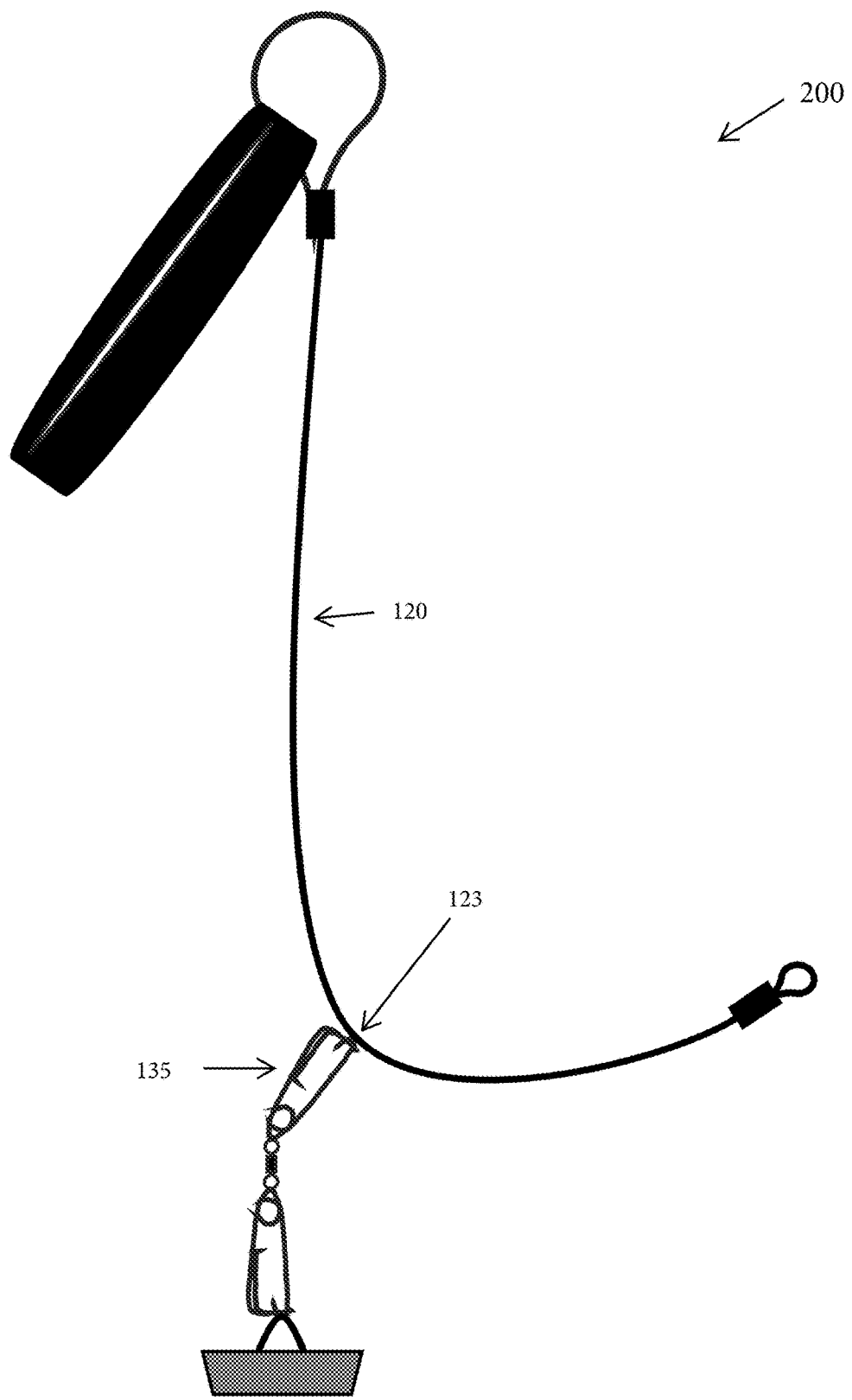
FIG. 2 depicts the system in a shortened depth configuration, demonstrating how the adjustable clip can be attached at any desired location on the cable to adjust to the water depth, according to various embodiments of the present technology.

FIG. 2 depicts the system 200 in a shortened depth configuration, demonstrating how the first water depth adjustable clip 135 can be attached at any desired location on the cable to adjust to the water depth, according to various embodiments of the present technology.

In some embodiments, the first water depth adjustable clip 135 being adjustable on the cable 120 allows for adjusting a connection point 123 between the top cable end 122 and the bottom cable end 124 according to water depth. This feature enables hunters to quickly and easily modify the length of the cable to suit varying water conditions. Adjusting by moving and clipping (i.e., sliding the first water depth adjustable clip 135 may be difficult because of a thickness of the cable 120) the first water depth adjustable clip 135 along the cable 120, the user can set the desired depth for the decoy, ensuring optimal positioning in the water. This adjustability is particularly beneficial in environments where water levels fluctuate, as it allows for real-time adjustments without the need for additional equipment. The secure grip of the first water depth adjustable clip 135 on the cable 120 ensures that the connection point 123 remains stable and does not slip, providing a reliable and efficient solution for waterfowl hunting. This capability enhances the overall versatility and usability of the system, making it a valuable tool for hunters in diverse waterfowl hunting scenarios.

Figure 3:
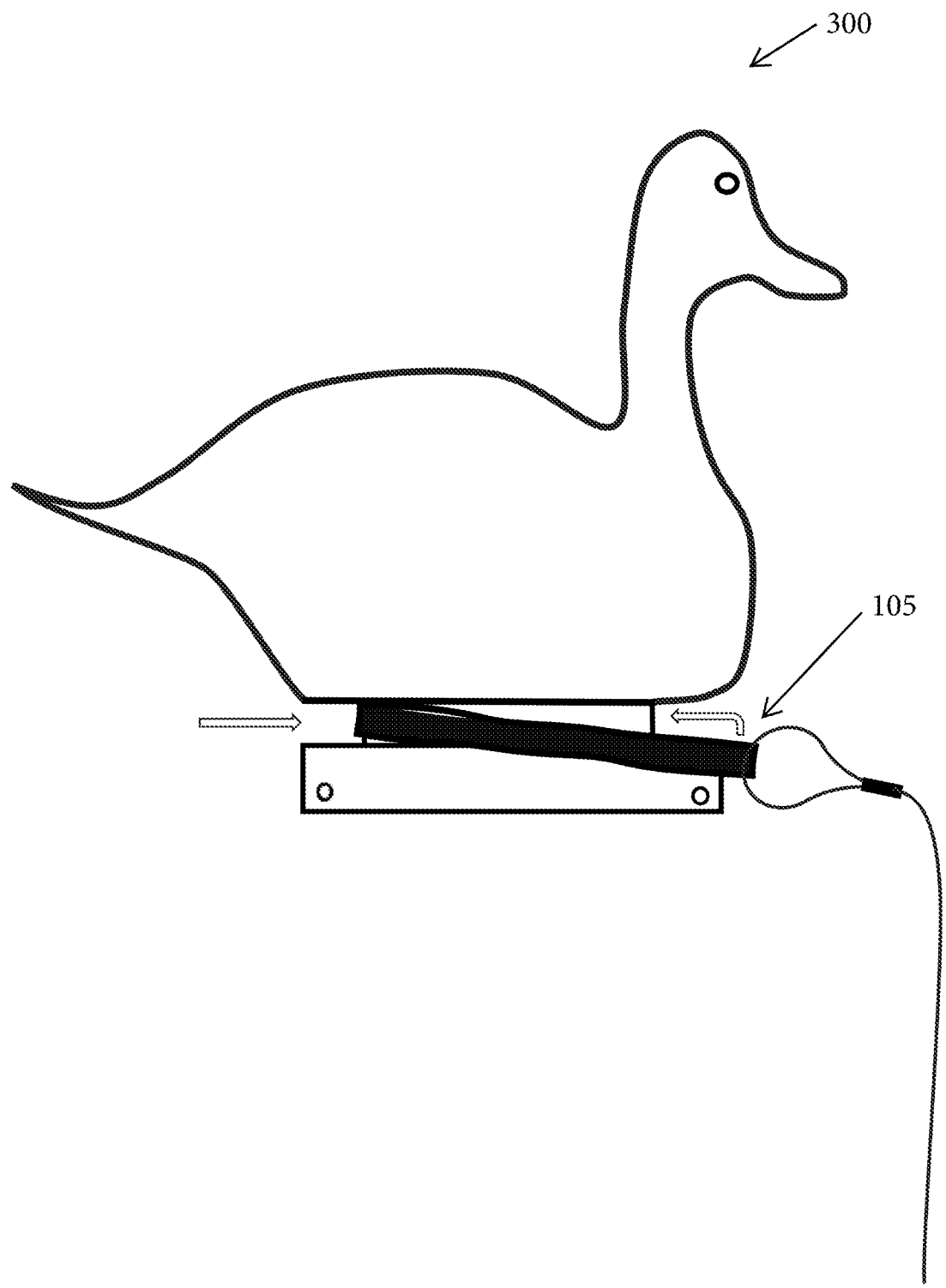
FIG. 3 shows the system of attaching the silicone band to the keel of the waterfowl hunting lure, highlighting the top finger loop for easy attachment and removal, according to various embodiments of the present technology.

FIG. 3 shows the system 300 of attaching the adjustable silicone band 105 to the keel of the waterfowl hunting lure, highlighting the top finger loop 110 for easy attachment and removal, according to various embodiments of the present technology.

According to some embodiments, FIG. 3 depicts the releasable attachment mechanism comprising elasticity of the adjustable silicone band 105 so that the adjustable silicone band 105 stretches when actuated between the closed storage state 600 (shown in FIG. 6) and the open state 100. This elasticity enables the adjustable silicone band 105 to securely wrap around the keel of the waterfowl hunting lure in the closed storage state 600 (shown in FIG. 6), effectively holding the cable 120 in place without tangling. When transitioning to the open state 100, the adjustable silicone band 105 stretches to release the cable 120, allowing for quick and easy attachment or removal from the decoy. This feature provides a convenient and efficient method for securing and deploying decoys, enhancing the overall usability of the system. The elasticity of the adjustable silicone band 105 ensures a snug fit around the keel, preventing accidental detachment during use, while also allowing for easy removal when needed. This dual functionality of the adjustable silicone band 105, facilitated by its elastic properties, significantly improves the efficiency and effectiveness of the decoy rigging process.

In some embodiments, the adjustable silicone band 105 is made from food grade silicone which is chemical, UV, and weather/temperature resistant, and is non-toxic, hypoallergenic and will not break down like a standard rubber band. The adjustable silicone band 105 material may be non-toxic and hypoallergenic, ensuring that it is safe for both the environment and the user. Unlike standard rubber bands, the food grade silicone band will not break down over time, providing long-lasting durability and reliability. The resistance to harsh environmental conditions means that the adjustable silicone band 105 can withstand prolonged exposure to sunlight, extreme temperatures, and various chemicals without degrading. This ensures that the adjustable silicone band 105 maintains its elasticity and functionality throughout many hunting seasons, making it a superior choice for securing waterfowl hunting lures. The use of food grade silicone enhances the overall quality and performance of the system, providing hunters with a dependable and efficient solution for their decoy rigging needs.

Figure 4:
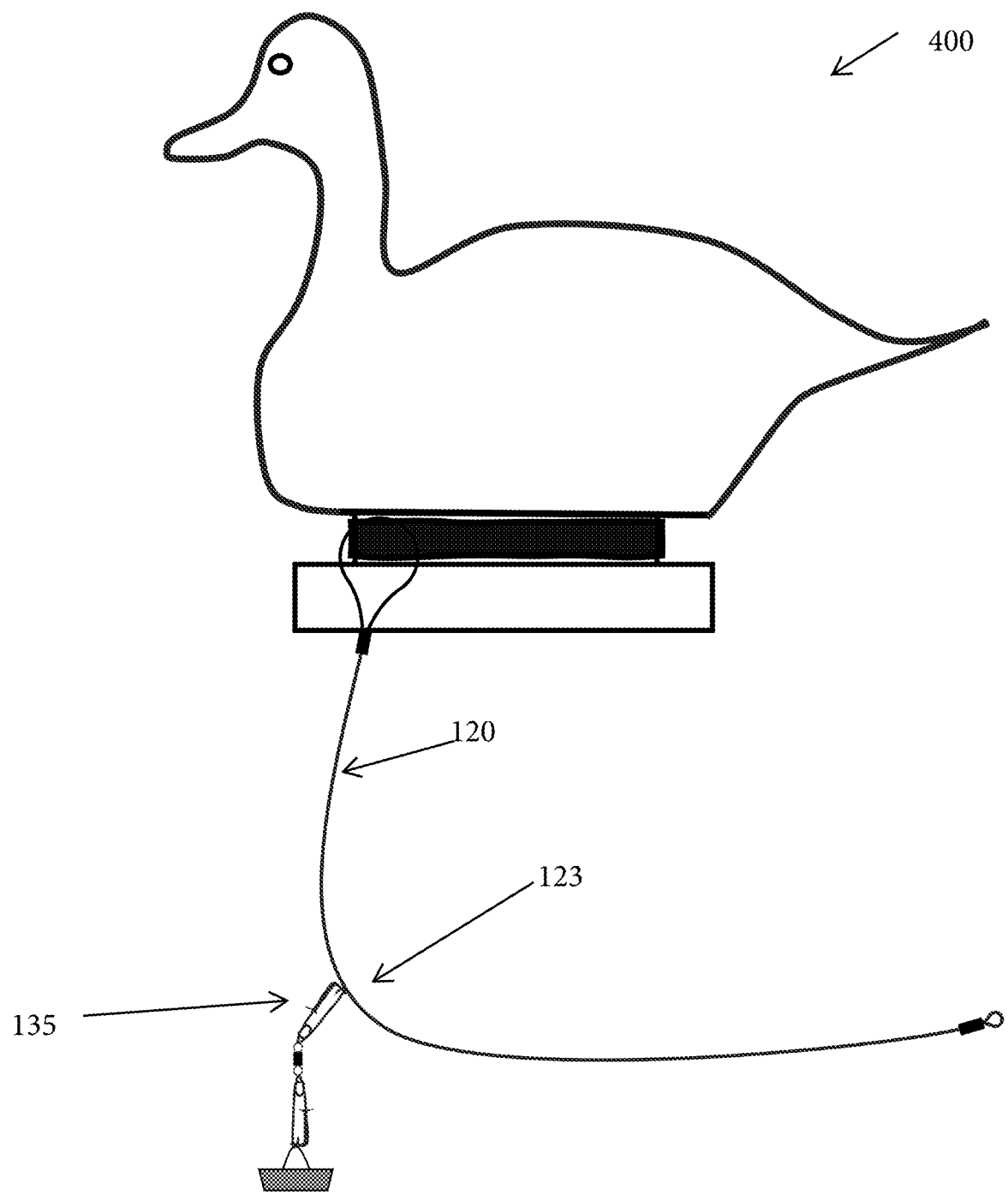
FIG. 4 illustrates a system in shallow water depths using the first water depth adjustable clip to adjust the system for various water depths, according to various embodiments of the present technology.

FIG. 4 illustrates a system 400 in shallow water depths using the first water depth adjustable clip 135 to adjust the system for various water depths, according to various embodiments of the present technology.

According to some embodiments, FIG. 4 illustrates the system 400 in shallow water depths, the first water depth adjustable clip 135 being adjustable on the cable 120 allowing for adjusting a connection point 123 between the top cable end 122 and the bottom cable end 124 according to water depth. This feature provides users (e.g., hunters) with the flexibility to modify the length of the cable 120 quickly and easily to suit varying water conditions. Adjusting by moving and clipping the first water depth adjustable clip 135 along the cable 120, the user can set the desired depth for the decoy, ensuring optimal positioning in the water. This adjustability is particularly beneficial in environments where water levels fluctuate, as it allows for real-time adjustments without the need for additional equipment. The secure grip of the first water depth adjustable clip 135 on the cable 120 ensures that the connection point 123 remains stable and does not slip, providing a reliable and efficient solution for waterfowl hunting. This capability enhances the overall versatility and usability of the system, making it a valuable tool for hunters in diverse waterfowl hunting scenarios.

In some embodiments, the bottom loop 130 is releasable attached to a swivel 140 using the first water depth adjustable clip 135 and the swivel 140 being releasable attached to the weight 150 using a second clip 145, the first water depth adjustable clip 135 being attached to the cable 120 at the connection point 123 between the top cable end 122 and the bottom cable end 124 according to water depth allowing for adjusting of the connection point 123 between the top cable end 122 and the bottom cable end 124 according to water depth.

Additionally, the first water depth adjustable clip 135 is particularly useful for adjusting the system to shallow water depths. In shallow water conditions, precise depth adjustment is crucial to ensure that the decoy remains stable and properly positioned. By using the adjustable clip 135, hunters can easily shorten the cable length, allowing the decoy to float at the desired depth without excess slack. This prevents the decoy from drifting or tipping over, which can occur if the cable is too long for the water depth. The ability to fine-tune the cable length for shallow water depths enhances the effectiveness of the decoy setup and ensures a more realistic presentation to attract waterfowl.

Figure 5:
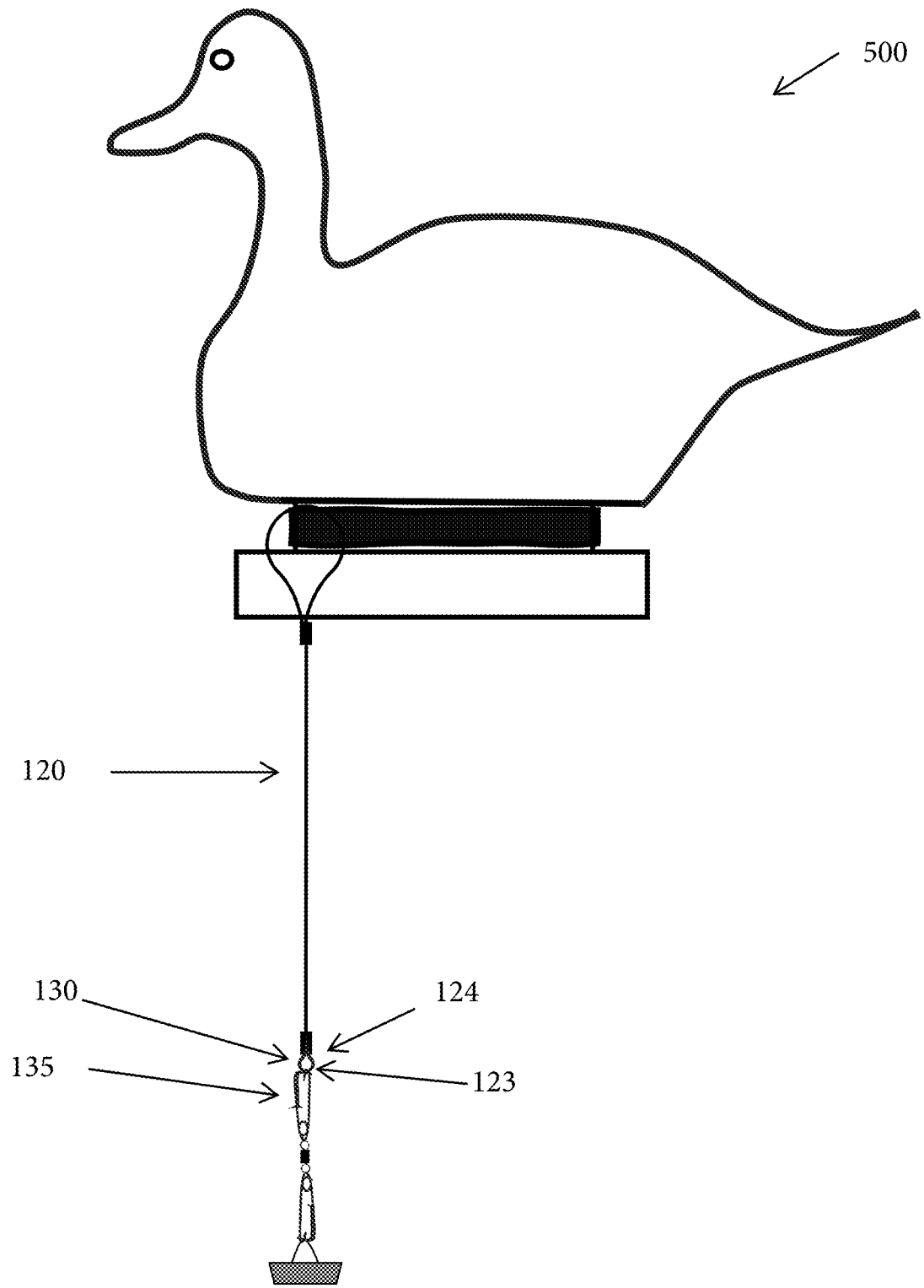
FIG. 5 illustrates a system for deep water depths using the first water depth adjustable clip to adjust the system for various water depths, according to various embodiments of the present technology.

FIG. 5 illustrates a system 500 for deep water depths using the first water depth adjustable clip 135 to adjust the system for various water depths, according to various embodiments of the present technology.

According to some embodiments, FIG. 5 illustrates, the first water depth adjustable clip 135 is adjustable on the cable 120, allowing for the adjustment of the connection point 123 between the top cable end 122 and the bottom cable end 124 according to water depth. In some embodiments the connection point 123 is at the bottom cable end 124 in deep water depths and may use a loop, such as the bottom loop 130.

Furthermore, the first water depth adjustable clip 135 is equally effective for adjusting the system to deep water depths. In deeper water conditions, the first water depth adjustable clip 135 allows users (e.g., hunters) to extend the cable length, ensuring that the decoy remains stable. This capability is particularly advantageous in environments where water depth can vary significantly, such as lakes or rivers. Adjusting by moving and clipping the first water depth adjustable clip 135 to the appropriate position on the cable 120, hunters can achieve the desired depth for the decoy, optimizing its visibility and effectiveness. The secure attachment of the first water depth adjustable clip 135 ensures that the cable length remains consistent, preventing the decoy from floating too high or sinking too low. This versatility in adjusting to both shallow and deep water depths makes the system a highly adaptable and valuable tool for waterfowl hunting.

In some embodiments, the bottom loop 130 is attached to one or more additional cables to allow the system to be water depth adjustable. This feature provides hunters with the flexibility to adapt the system to various water depths by simply connecting additional cables as needed. For instance, in deeper water conditions, an additional six-foot cable can be attached to the bottom loop 130, effectively extending the length of the system. This modular approach ensures that the decoy remains properly positioned regardless of the water depth, enhancing the effectiveness of the hunting setup. The ability to easily add or remove cables also simplifies the process of adjusting the system, making it more user-friendly and efficient. The secure attachment of the additional cables to the bottom loop 130 ensures that the system remains stable and tangle-free, providing a reliable solution for waterfowl hunters, particularly at deep water depths.

Figure 6:
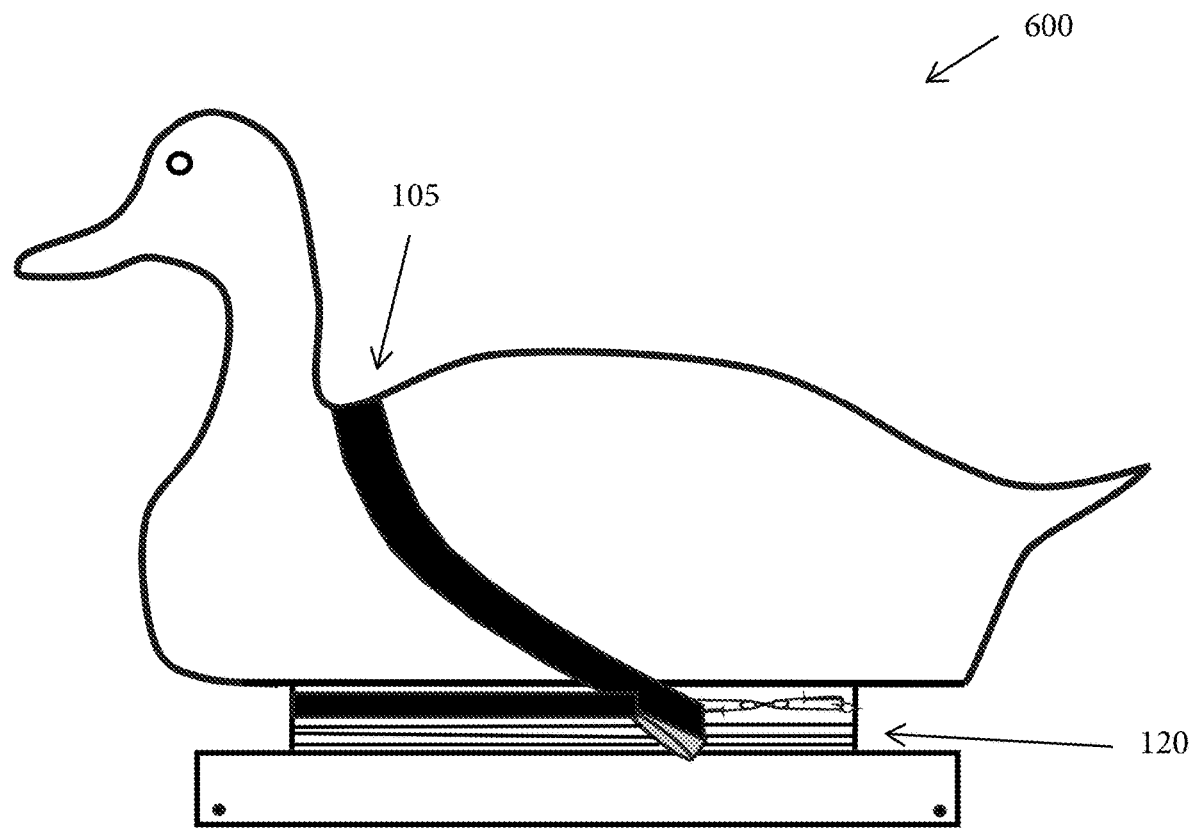
FIG. 6 illustrates a system in the storage state, where the silicone band is draped over the decoy head, and the cable is wrapped around the keel, with the weight secured by the silicone band to prevent tangling and scratching of the decoy, according to various embodiments of the present technology.

FIG. 6 illustrates a system in the storage state 600, where the adjustable silicone band 105 is draped over the decoy head, and the cable 120 is wrapped around the keel, with the weight 150 secured by the adjustable silicone band 105 to prevent tangling and scratching of the decoy, according to various embodiments of the present technology.

According to some embodiments, the adjustable silicone band 105 allows for connection and removal of the top cable end 122 from the waterfowl hunting lure, the adjustable silicone band 105 being actuatable to a closed storage state 600 as shown in FIG. 6. The adjustable silicone band 105 may include the releasable attachment mechanism; the releasable attachment mechanism comprising elasticity of the adjustable silicone band 105 so that the adjustable silicone band 105 stretches when actuated between the open state 100 and the closed storage state 600. For example, the closed storage state 600 attaching a length of the cable 120 to the keel of the waterfowl hunting lure without tangling the length of the cable 120.

In addition to the embodiments described, the present technology may include several additional embodiments that further enhance the functionality and versatility of the non-tangle, water depth adjustable system for securing waterfowl hunting lures. In some embodiments, the system may include a quick-release mechanism for the adjustable silicone band 105. This quick-release mechanism allows for even faster attachment and removal of the adjustable silicone band 105 from the keel of the waterfowl hunting lure. For example, a user may simply press a button or lever to release the the adjustable silicone band 105, making the process more efficient and user-friendly.

In some embodiments, the system may include a locking mechanism for the adjustable stainless steel clips (e.g., the first water depth adjustable clip 135). This locking mechanism ensures that once the desired depth is set, the clip (e.g., the first water depth adjustable clip 135) remains securely in place, preventing any accidental adjustments. This feature is particularly useful in rough water conditions where the decoy may be subjected to strong currents or waves.

In some embodiments, the system may include interchangeable weights. These weights can be easily attached or detached from the bottom cable end, allowing hunters to customize the weight according to the specific water conditions. For example, heavier weights may be used in fast-moving water, while lighter weights may be suitable for calm, shallow waters.

In some embodiments, the system may include a modular design that allows for the addition of multiple decoys on a single cable. This modular design enables hunters to create a more realistic and effective decoy spread by attaching several decoys at varying depths along the same cable. The modular system may include additional clips and swivels to facilitate the attachment of multiple decoys.

In some embodiments, the system may include a weather-resistant storage bag. This storage bag is designed to hold the decoys, cables, and weights, keeping them organized and protected when not in use. The weather-resistant material ensures that the contents remain dry and free from damage, even in harsh outdoor conditions.

In some embodiments, the system may include a camouflage coating on the adjustable silicone band 105 and the cable 120. This camouflage coating helps the system blend in with the natural environment, making it less visible to waterfowl and increasing the effectiveness of the decoy setup. The camouflage pattern may be customized to match the specific hunting terrain, such as marshes, lakes, or rivers. These additional embodiments provide further enhancements to the non-tangle, water depth adjustable system for securing waterfowl hunting lures, making it a versatile and valuable tool for hunters in various conditions and environments.

While this technology is susceptible of embodiments in many different forms, there is shown in the drawings and has been described in detail several specific embodiments with the understanding that the present disclosure is to be considered as an exemplification of the principles of the technology and is not intended to limit the technology to the embodiments illustrated.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer, or section discussed below could be termed a second element, component, region, layer, or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography, and/or others.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A non-tangle, water depth adjustable system for securing a waterfowl hunting lure, the system comprising:
    an adjustable silicone band, the adjustable silicone band being connectable and removable from a fitted position around a keel of the waterfowl hunting lure by a releasable attachment mechanism;
    a cable comprising:
        a top cable end comprising a top finger loop for being connected to the keel of the waterfowl hunting lure by the adjustable silicone band; and
        a bottom cable end for being connected to a weight;
    the adjustable silicone band being actuatable between a closed storage state and an open state;
    wherein the releasable attachment mechanism comprises the top finger loop and elasticity of the adjustable silicone band so that the adjustable silicone band stretches when actuated between the closed storage state and the open state;
    wherein the closed storage state configuration includes attaching a length of the cable to the keel of the waterfowl hunting lure without tangling the length of the cable, the closed storage state being the adjustable silicone band securely attaching to a body of the waterfowl hunting lure and to the fitted position around the keel, and attaching the length of the cable around the keel of the waterfowl hunting lure without tangling the length of the cable, and securely attaching the weight to the keel by the adjustable silicone band;
    wherein the open state configuration includes fitting the adjustable silicone band around the keel, connecting the top cable end to the keel of the waterfowl hunting lure by the adjustable silicone band, and releasing the bottom cable end for being connected to the weight and releasing the length of the cable from the keel of the waterfowl hunting lure without tangling the length of the cable; and
    a first water depth adjustable clip configured to securely grip the cable at a selected connection point while maintaining the cable in an untangled configuration, the selected connection point being selectively positionable along the length of the cable between the top cable end and the bottom cable end, the first water depth adjustable clip maintaining anti-tangle properties of the cable at the selected connection point by preventing cable deformation while gripped and the first water depth adjustable clip being configured to:
        a) maintain anti-tangle properties of the cable at the selected connection point by preventing deformation of the cable while gripped;
        b) enable selective positioning and maintenance of the selected connection point along the cable during use;
        c) divide the cable into an adjustable upper portion of the cable and an adjustable lower portion of the cable defined by the selected connection point;
        d) allow selective adjustment of relative lengths of the adjustable upper portion of the cable and the adjustable lower portion of the cable while maintaining the cable in a substantially straight, untangled configuration; and
        e) maintain the selected connection point during use while allowing swivel rotation via a swivel being directly connected to the first water depth adjustable clip at the selected connection point, the swivel enabling the bottom cable end to rotate freely and independently of the top cable end thereby preventing tangling of the cable during use, specifically during depth adjustment;

wherein the swivel is directly connected to the first water depth adjustable clip at the selected connection point enabling the swivel rotation, the swivel enabling the bottom cable end to rotate freely independently of the top cable end specifically during depth adjustment, and the swivel maintaining rotational independence even when the first water depth adjustable clip is gripping the cable thereby preventing tangling of the cable during use, specifically during water depth adjustment.

2. The system of claim 1, wherein the cable comprises a vinyl coated, rust less metal material, the vinyl coated, rust less metal material being tangle free.

3. The system of claim 1, wherein the bottom cable end comprises a bottom loop, the bottom loop being a loop in the bottom cable end for connecting the bottom cable end to the weight.

4. The system of claim 3, wherein a bottom loop perimeter is smaller than a top finger loop perimeter.

5. The system of claim 3, wherein the bottom loop is attached to one or more additional cables to allow the system to be water depth adjustable.

6. The system of claim 3, wherein the bottom loop is releasably attached to a second swivel using a clip and the second swivel being releasably attached to the weight using a second clip.

7. A non-tangle, water depth adjustable system for securing a waterfowl hunting lure, the system comprising:
an adjustable silicone band, the adjustable silicone band being connectable and removable from a fitted position around a keel of the waterfowl hunting lure by a releasable attachment mechanism;
a cable comprising:
a top cable end comprising a top finger loop for being connected to the keel of the waterfowl hunting lure by the adjustable silicone band; and
a bottom cable end for being connected to a weight;
the adjustable silicone band being actuatable between a closed storage state and an open state;
wherein the releasable attachment mechanism comprises the top finger loop and elasticity of the adjustable silicone band so that the adjustable silicone band stretches when actuated between the open state and the closed storage state;
wherein the closed storage state configuration includes attaching a length of the cable to the keel of the waterfowl hunting lure without tangling the length of the cable, the closed storage state being the adjustable silicone band securely attaching to a body of the waterfowl hunting lure and to the fitted position around the keel, and attaching the length of the cable around the keel of the waterfowl hunting lure without tangling the length of the cable, and securely attaching the weight to the keel by the adjustable silicone band;
wherein the open state configuration includes fitting the adjustable silicone band around the keel, connecting the top cable end to the keel of the waterfowl hunting lure by the adjustable silicone band, and releasing the bottom cable end for being connected to the weight and releasing the length of the cable from the keel of the waterfowl hunting lure without tangling the length of the cable; and
a first water depth adjustable clip configured to securely grip the cable at a selected connection point while maintaining the cable in an untangled configuration, the selected connection point being selectively positionable along the length of the cable between the top cable end and the bottom cable end, the first water depth adjustable clip maintaining anti-tangle properties of the cable at the selected connection point by preventing cable deformation while gripped and the first water depth adjustable clip being configured to:
a) maintain anti-tangle properties of the cable at the selected connection point by preventing deformation of the cable while gripped;
b) enable selective positioning and maintenance of the selected connection point along the cable during use;
c) divide the cable into an adjustable upper portion of the cable and an adjustable lower portion of the cable defined by the selected connection point;
d) allow selective adjustment of relative lengths of the adjustable upper portion of the cable and the adjustable lower portion of the cable while maintaining the cable in a substantially straight, untangled configuration; and
e) maintain the selected connection point during use while allowing swivel rotation via a swivel being directly connected to the first water depth adjustable clip at the selected connection point, the swivel enabling the bottom cable end to rotate freely and independently of the top cable end thereby preventing tangling of the cable during use, specifically during depth adjustment;

wherein the swivel is directly connected to the first water depth adjustable clip at the selected connection point enabling the swivel rotation, the swivel enabling the bottom cable end to rotate freely independently of the top cable end specifically during depth adjustment, and the swivel maintaining rotational independence even when the first water depth adjustable clip is gripping the cable thereby preventing tangling of the cable during use, specifically during water depth adjustment;

wherein the first water depth adjustable clip is made of stainless steel.

8. The system of claim 7, wherein the cable comprises a vinyl coated, rust less metal material, the vinyl coated, rust less metal material being tangle free.

9. The system of claim 7, wherein the bottom cable end comprises a bottom loop, wherein a bottom loop perimeter is smaller than a top finger loop perimeter.

10. The system of claim 7, wherein the adjustable silicone band being is made from food grade silicone.

11. The system of claim 7, wherein the bottom cable end comprises a bottom loop, wherein the bottom loop is attached to one or more additional cables to allow the system to be water depth adjustable.

12. A non-tangle, water depth adjustable system for securing a waterfowl hunting lure, the system comprising:
an adjustable silicone band, the adjustable silicone band being connectable and removable from a fitted position around a keel of the waterfowl hunting lure by a releasable attachment mechanism;
a cable being a vinyl coated, rust less metal material, the vinyl coated, rust less metal material being tangle free, the cable comprising:
a top cable end comprising a top finger loop for being connected to the keel of the waterfowl hunting lure by the adjustable silicone band and the top finger loop being formed using an aluminum crimp; and
a bottom cable end for being connected to a weight;
the adjustable silicone band being actuatable between a closed storage state and an open state;

wherein the releasable attachment mechanism comprises elasticity of the adjustable silicone band so that the adjustable silicone band stretches when actuated between the open state and the closed storage state;

wherein the closed storage state configuration includes attaching a length of the cable to the keel of the waterfowl hunting lure without tangling the length of the cable, the closed storage state being the adjustable silicone band securely attaching to a body of the waterfowl hunting lure and to the fitted position around the keel, and attaching the length of the cable around the keel of the waterfowl hunting lure without tangling the length of the cable, and securely attaching the weight to the keel by the adjustable silicone band;

wherein the open state configuration includes connecting the top cable end to the keel of the waterfowl hunting lure by the adjustable silicone band and releasing the bottom cable end for being connected to the weight and releasing the length of the cable from the keel of the waterfowl hunting lure without tangling the length of the cable; and a first water depth adjustable clip configured to securely grip the cable at a selected connection point while maintaining the cable in an untangled configuration, the selected connection point being selectively positionable along the length of the cable between the top cable end and the bottom cable end, the first water depth adjustable clip maintaining anti-tangle properties of the cable at the selected connection point by preventing cable deformation while gripped and the first water depth adjustable clip being configured to:

a) maintain anti-tangle properties of the cable at the selected connection point by preventing deformation of the cable while gripped;

b) enable selective positioning and maintenance of the selected connection point along the cable during use;

c) divide the cable into an adjustable upper portion of the cable and an adjustable lower portion of the cable defined by the selected connection point;

d) allow selective adjustment of relative lengths of the adjustable upper portion of the cable and the adjustable lower portion of the cable while maintaining the cable in a substantially straight, untangled configuration; and e) maintain the selected connection point during use while allowing swivel rotation via a swivel being directly connected to the first water depth adjustable clip at the selected connection point, the swivel enabling the bottom cable end to rotate freely and independently of the top cable end thereby preventing tangling of the cable during use, specifically during depth adjustment;

wherein the swivel is directly connected to the first water depth adjustable clip at the selected connection point enabling the swivel rotation, the swivel enabling the bottom cable end to rotate freely independently of the top cable end specifically during depth adjustment, and the swivel maintaining rotational independence even when the first water depth adjustable clip is gripping the cable thereby preventing tangling of the cable during use, specifically during water depth adjustment.

13. The system of claim 12, wherein the bottom cable end comprises a bottom loop, wherein a bottom loop perimeter is smaller than a top finger loop perimeter.

14. The system of claim 12, wherein the adjustable silicone band is made from food grade silicone.

* * * * *